(12) United States Patent
Bowers et al.

(10) Patent No.: US 11,072,345 B2
(45) Date of Patent: Jul. 27, 2021

(54) SYSTEM AND METHOD FOR CONTROLLING OPERATION OF A VEHICLE USING AN ALCOHOL DETECTION APPARATUS

(71) Applicant: Automotive Coalition For Traffic Safety, Inc., Washington, DC (US)

(72) Inventors: Kyle Bowers, Marlborough, MA (US); Abdullatif Zaouk, Marlborough, MA (US); Robert Strassburger, Marlborough, MA (US); Michael Willis, Marlborough, MA (US); Neeraj Dalal, Marlborough, MA (US)

(73) Assignee: Automotive Coalition For Traffic Safety, Inc., Sterling, VA (US)

( * ) Notice: Subject to any disclaimer, the term of this patent is extended or adjusted under 35 U.S.C. 154(b) by 0 days.

(21) Appl. No.: 16/566,415

(22) Filed: Sep. 10, 2019

(65) Prior Publication Data

US 2020/0101982 A1  Apr. 2, 2020

Related U.S. Application Data

(60) Provisional application No. 62/728,898, filed on Sep. 10, 2018.

(51) Int. Cl.
*B60W 50/12* (2012.01)
*B60W 40/08* (2012.01)
(Continued)

(52) U.S. Cl.
CPC ............ *B60W 50/12* (2013.01); *B60K 28/04* (2013.01); *B60K 35/00* (2013.01); *B60W 40/08* (2013.01);
(Continued)

(58) Field of Classification Search
CPC .. B60W 50/12; B60W 40/08; B60W 2540/24; B60K 28/04; B60K 2370/143; B60K 2370/148
(Continued)

(56) References Cited

U.S. PATENT DOCUMENTS 3,780,311 A * 12/1973 Brown ................. B60K 28/063
307/10.6
4,294,327 A   10/1981 Howard
(Continued)

FOREIGN PATENT DOCUMENTS

CN      101624015      1/2010
CN      104816692      8/2015
(Continued)

*Primary Examiner* — John A Tweel, Jr.
(74) *Attorney, Agent, or Firm* — Pandiscio & Pandiscio

(57) ABSTRACT

A system for controlling operation of a vehicle, the system comprising:
a voice synthesizer unit for providing voice communication to a driver;
a speech recognition unit for receiving speech from a driver;
a breath alcohol sensor unit for detecting a presence of alcohol on the breath of a driver and providing a signal representative of the same;
a vehicle operation interface for controlling operation of the vehicle; and
a controller for (i) selectively causing the voice synthesizer unit to speak to the driver, (ii) operating the speech recognition unit to detect speech by the driver, (iii) receiving the signal from the breath alcohol sensor unit, and (iv) depending on the signal received from the breath alcohol sensor unit, providing a command to the vehicle operation interface to control operation of the vehicle.

26 Claims, 8 Drawing Sheets

(51) Int. Cl.
*B60K 28/04* (2006.01)
*B60K 35/00* (2006.01)

(52) U.S. Cl.
CPC .. *B60K 2370/143* (2019.05); *B60K 2370/148* (2019.05); *B60K 2370/736* (2019.05); *B60W 2040/0872* (2013.01); *B60W 2540/24* (2013.01)

(58) Field of Classification Search
USPC ...................................................... 340/573.1
See application file for complete search history.

(56) References Cited

U.S. PATENT DOCUMENTS

| | | | | |
|---|---|---|---|---|
| 6,142,951 | A * | 11/2000 | Park | G01N 33/4972 463/47.2 |
| 6,608,399 | B2 * | 8/2003 | McConnell | B60R 11/02 307/10.1 |
| 6,726,636 | B2 * | 4/2004 | Der Ghazarian | B60K 28/063 600/532 |
| 6,748,301 | B1 * | 6/2004 | Ryu | B60K 28/063 340/426.11 |
| 7,671,752 | B2 | 3/2010 | Sofer | |
| 9,073,431 | B2 * | 7/2015 | Takahashi | B60K 28/063 |
| 9,823,237 | B2 | 11/2017 | Martin et al. | |
| 2012/0112879 | A1 | 5/2012 | Ekchian et al. | |
| 2015/0066238 | A1 | 3/2015 | Todd et al. | |
| 2015/0219620 | A1 | 8/2015 | Hok et al. | |
| 2015/0233897 | A1 | 8/2015 | Hok et al. | |
| 2016/0356764 | A1 | 12/2016 | Martin et al. | |
| 2017/0050518 | A1 | 2/2017 | Steeg et al. | |
| 2017/0274768 | A1 | 9/2017 | Hök et al. | |

FOREIGN PATENT DOCUMENTS

| | | |
|---|---|---|
| KR | 20080110567 | 12/2008 |
| WO | WO 2009/048809 | 4/2009 |

* cited by examiner

SYSTEM AND METHOD FOR CONTROLLING OPERATION OF A VEHICLE USING AN ALCOHOL DETECTION APPARATUS

REFERENCE TO PENDING PRIOR PATENT APPLICATION

This patent application claims benefit of prior U.S. Provisional Patent Application Ser. No. 62/728,898, filed Sep. 10, 2018 by Automotive Coalition For Traffic Safety, Inc. and Kyle Bowers et al. for DADSS Voice Activated Start, which patent application is hereby incorporated herein by reference.

FIELD OF THE INVENTION

This invention relates to Alcohol Detection Systems (ADS) in general, and more particularly to a voice-activated vehicle start used in conjunction with a Driver Alcohol Detection System for Safety (DADSS).

BACKGROUND OF THE INVENTION

Every year in the United States of America, drunk driving claims approximately 10,000 lives and costs approximately $194 billion (National Highway Traffic Safety Administration (NHTSA). "The Economic and Societal Impact Of Motor Vehicle Crashes, 2010." Washington (DC), May 2015 (Revised), DOT HS 812 013. Available at URL: http://www-nrd.nhtsa.dot.gov/Pubs/812013.pdf). Alcohol-impaired driving fatalities account for more than ⅓ of all motor vehicle traffic fatalities in the United States (National Highway Traffic Safety Administration (NHTSA). "Traffic Safety Facts 2013 Data: Alcohol-Impaired Driving." Washington (DC), December 2014, DOT HS 812 102. Available at URL: http://www-nrd.nhtsa.dot.gov/Pubs/812102.pdf). In 2013, of the fatalities among children age 14 and younger, 17 percent occurred in alcohol-impaired-driving crashes (National Highway Traffic Safety Administration (NHTSA). "Traffic Safety Facts 2013 Data: Alcohol-Impaired Driving." Washington (DC), December 2014, DOT HS 812 102. Available at URL: http://www-nrd.nhtsa.dot.gov/Pubs/812102.pdf). An analysis by the Insurance Institute for Highway Safety indicates that if driver blood alcohol concentrations (BACs) can be limited to no more than 0.08%—the legal limit in all 50 states except Utah—approximately 7,000 lives could be saved annually (Insurance Institute for Highway Safety Data Institute. "Alcohol Detection Device Project is now in Development Phase." Insurance Institute for Highway Safety, November 2011. Available at URL: http://www.iihs.org/iihs/sr/statusreport/article/46/10/4).

Thus there exists the need for a technology that can prevent or reduce drunk driving.

SUMMARY OF THE INVENTION

Prior art alcohol detection systems are generally installed after drivers are convicted of an "operating-under-the-influence" (OUI) offense. Prior art systems require after-market installation of an interlock system that the operator must blow into (and then "pass" the alcohol detection test performed by the interlock system) before starting the vehicle. It is clear to the inventors that there is a need for a new technology that can accomplish one or more of the following:

Prevent drunk driving by disabling the starting of a vehicle if the driver is impaired Letting drivers know if they are over the legal limit and/or if it is unsafe for them to drive Inform drivers when the presence of alcohol is detected Sending an alert over a network when alcohol is detected System is integrated into the vehicle and is purchased as an option It is also clear to the inventors that this new technology will achieve one or more of the following benefits:

It will prevent or decrease drunk driving

It will save lives

It will make the roads safer

It will let drivers know if they are over the legal limit or if it is unsafe to drive It will help parents make sure their teenage children are not drinking and driving It will help businesses avoid costly lawsuits The present invention comprises the provision and use of a new technology called the Alcohol Detection System (ADS) which detects when a driver is intoxicated with a blood alcohol concentration (BAC) at or above 0.08%—the legal limit in all 50 states except Utah—and prevents the car from moving.

In one form of the invention, the technology utilizes a breath-based system which measures alcohol as a driver breathes normally when in the driver's seat. It is designed to take instantaneous readings of blood alcohol concentration as the driver breathes normally and to accurately and reliably distinguish between the driver's breath and that of any passengers.

In one form of the invention, the technology utilizes a speech recognition system that can understand a driver's voice command such as "start car". The alcohol measurement is taken in real-time and synchronized to the driver giving the voice command. If the system detects a BAC measurement above a predetermined threshold, the vehicle is disabled or prevented from moving. The system may give warnings if the measurement is above a predetermined threshold.

In one form of the invention, the technology utilizes a speech synthesis system that can be used to inform the driver of events such as "alcohol detected" and "vehicle start disabled", or "vehicle prevented from moving".

In one form of the invention, the technology is an internet of things (IoT) application, capable of sending cellular alerts and data. It is also able to upload vehicle and alcohol data over a wireless network to "the cloud" (e.g., one or more remote servers). A "Data-Viewer" computer program of the sort known in the art may be used to analyze the uploaded data.

In one form of the invention, the technology also utilizes a touch-based system which measures blood alcohol levels under the skin of the driver by shining an infrared or near infrared light through the fingertip of the driver. The touch-based system is integrated into the vehicle controls, such as the start button or steering wheel, and takes multiple, accurate readings.

In one form of the invention, there is provided a system for controlling operation of a vehicle, the system comprising:

a voice synthesizer unit for providing voice communication to a driver;

a speech recognition unit for receiving speech from a driver;

a breath alcohol sensor unit for detecting a presence of alcohol on the breath of a driver and providing a signal representative of the same;

a vehicle operation interface for controlling operation of the vehicle; and a controller for (i) selectively causing the voice synthesizer unit to speak to the driver, (ii) operating the speech recognition unit to detect speech by the driver, (iii) receiving the signal from the breath alcohol sensor unit, and (iv) depending on the signal received from the breath alcohol sensor unit, providing a command to the vehicle operation interface to control operation of the vehicle.

In another form of the invention, there is provided a method for controlling operation of a vehicle occupied by a driver, the method comprising:

identifying a voice command of the driver using a speech recognition system unit;

taking at least one alcohol measurement of the driver;

determining whether the alcohol measurement of the driver is above or below a pre-determined threshold; and controlling the operation of the vehicle based on the alcohol measurement being above or below the pre-determined threshold.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

In accordance with the present invention, the new voice-activated vehicle start system is an integrated system that is capable of determining if the driver has a presence of alcohol and disables the starting of the vehicle, or prevents movement, if the driver's blood alcohol level is above a predetermined threshold.

In the teaching of this patent, the inventors use the term vehicle, which the reader could interpret as referring to a car, truck, motorcycle or any other type of vehicle known in present-day technologies. The inventors, however, do not apply limits to this technology and it should be clear to the reader that the methods and apparatus of the present invention could be implemented in any motorized transportation means, such as a plane, train, bus, boat, jet-ski, submarine, jet, helicopter, space-craft, snowmobile, construction equipment, oil-drilling equipment, heavy-machinery, etc., or unmotorized means such as sailboats, gliders, bicycles, etc., including manually controlled, semi-autonomous or autonomous vehicles.

Figure 1:
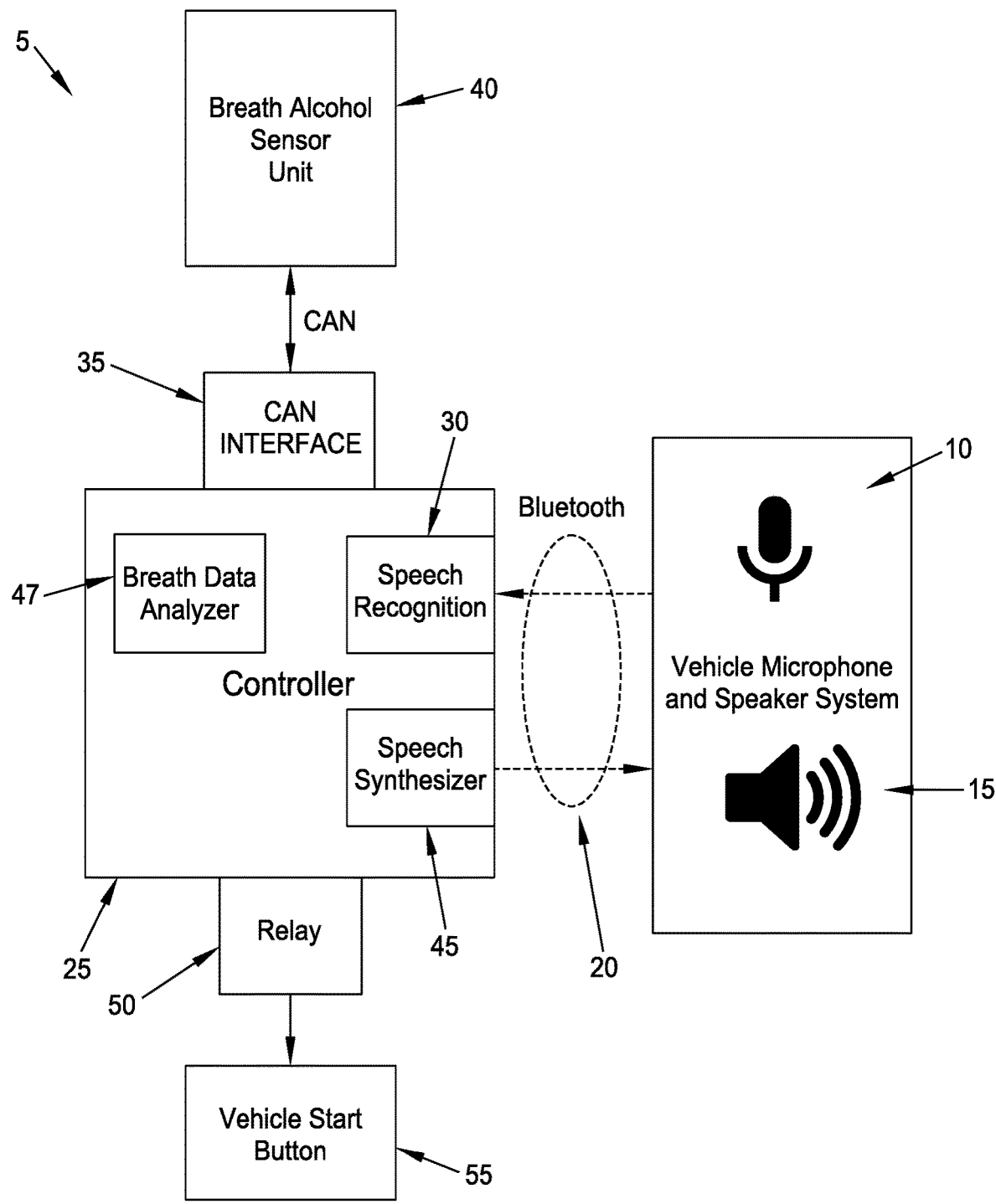
FIG. 1 is an exemplary block diagram of the voice-activated vehicle start system of the present invention.

FIG. 1 is an exemplary block diagram of the voice-activated vehicle start system 5 integrated into a vehicle. In this concept, the system 5 utilizes the vehicle's integrated microphone 10 and speaker 15 over a Bluetooth interface 20. In another form of the invention, the system could use other interfaces such as WiFi, Zigbee or other wired or wireless interfaces known to those skilled in the art. In another form of the invention, the system 5 contains its own speaker and one or more microphones. System 5 comprises a controller 25 for controlling operation of the system. In one form of the invention, the controller 25 contains a speech recognition unit 30 that is able to parse the words spoken by the operator. This enables the system 5 to respond to voice commands such as "Start Car" or "Turn Off Ignition". The controller 25 uses a controller area network (CAN) interface 35 to communicate with the breath alcohol sensor unit 40. Those skilled in the art can appreciate that CAN interfaces are widely used in automotive applications. In one form of the invention, the controller 25 uses a speech synthesizer unit 45 to generate voice prompts to the operator such as "alcohol detected, vehicle disabled" or "no alcohol detected, starting car" in response to the operator voice commands and in concert with the breath alcohol sensor measurements.

Breath alcohol sensor unit 40 may comprise any breath alcohol sensor unit capable of acquiring the exhaled breath of a driver and analyzing the exhaled breath to determine the blood alcohol content of the driver (which is a function of the breath alcohol concentration of the driver). By way of example but not limitation, breath alcohol sensor unit 40 may comprise the breath alcohol sensor unit disclosed in (i) U.S. Patent Publication No. 2015/0219620, published Aug. 6, 2015, by Automotive Coalition for Traffic Safety, Inc. and Bertil Hok et al. for BREATH TEST SYSTEM, (ii) U.S. Patent Publication No. 2015/0233897, published Aug. 20, 2015, by Automotive Coalition for Traffic Safety, Inc. and Bertil Hok et al. for HIGHLY ACCURATE BREATH TEST SYSTEM, (iii) U.S. Patent Publication No. 2017/0274768, published Sep. 28, 2017, by Automotive Coalition for Traffic Safety, Inc. and Bertil Hok et al. for SENSOR SYSTEM FOR PASSIVE IN-VEHICLE BREATH ALCOHOL ESTIMATION, and (iv) U.S. Patent Publication No. 2016/0356764, published Dec. 8, 2016, by Automotive Coalition for Traffic Safety, Inc. and Hans Göran Evald Martin et al. for INTEGRATED BREATH ALCOHOL SENSOR SYSTEM, which patent publications are hereby incorporated herein by reference.

Figure 2:
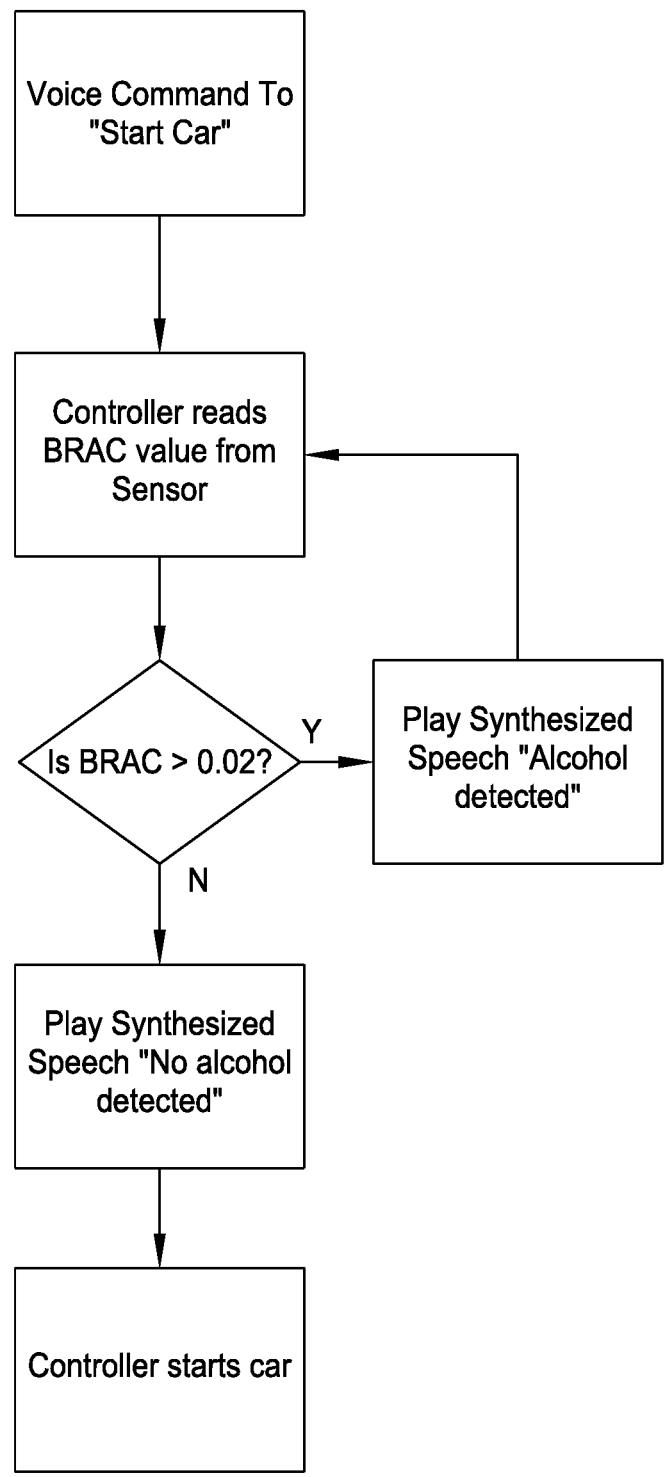
FIG. 2 is a flow diagram showing an exemplary method of the voice-activated vehicle start.

Now turning to FIG. 2, an exemplary method of a safe vehicle start using the system 5 is shown. In FIG. 2, the operator gives a "start car" command to begin the sequence. In one form of the invention, the breath sample is taken in real-time as the person speaks. As those skilled in the art can appreciate, the present invention is different than the prior art because the breath alcohol concentration (BRAC) measurement is synchronized in real-time to the person speaking, as opposed to collecting the sample prior to attempting to start the vehicle. More detail of the sensor measurement process is described later in this document. When the controller 25 receives the blood alcohol concentration data from the breath alcohol sensor unit 40, controller 25 compares it to a predetermined threshold value, e.g., using the Breath Data Analyzer 47 shown in FIG. 1 (it should be appreciated that Breath Data Analyzer 47 is essentially a decision tree implemented by appropriate software running on the controller 25). The predetermined value shown in FIG. 2 is 0.02 (i.e. a 0.02% blood alcohol concentration), which may be an appropriate value for a teenage driver or a school bus operator. However, other values may be used, such 0.08 (i.e., a 0.08% blood alcohol concentration) which is the legal limited for many states in the United States. In this example, the blood alcohol concentration of the operator is compared to the 0.02 threshold. If the value is above the predetermined threshold, the system 5 plays the prompt "alcohol detected". This may be accompanied by other messages such as "vehicle disabled". If the driver's blood alcohol concentration value is below the predetermined threshold, the system plays the prompt "no alcohol detected" and starts the car. The flow diagram in FIG. 2 could be modified to warn "alcohol detected" above a predetermined threshold such as 0.02, but not disable the vehicle start until a second predetermined threshold is reached, such as 0.08. The system 5 may give a countdown to the start or provide additional synthesized speech prompts.

Returning to FIG. 1, the system 5 uses a relay 50 that is connected to the contacts of the vehicle start pushbutton 55. It can be appreciated that other methods for starting the car could be used as well, such as a remote start, sending CAN messages to the vehicle's ignition controller, automated key turn, etc. In one form of the invention, the voice-activated vehicle start system 5 allows the vehicle to be started but disables the transmission shifter instead, so that the vehicle may not be driven. For example, the school bus driver is unable to put the bus into gear due to a transmission locking mechanism. This method can be preferable in very cold or very warm climate zones and allows the operator to use the heater or air conditioning, so vehicle's cabin temperature is at a comfortable and/or safe setting, while disabling the vehicle from moving.

It should be appreciated that the accuracy of a BRAC measurement depends on the volume of exhaled breath which is provided to the alcohol detection system: the greater the volume of exhaled breath, the greater the accuracy of the BRAC measurement (and hence the greater the accuracy of the determination of the blood alcohol concentration of the driver). It should also be appreciated that with a voice-activated automobile start system, the driver is automatically exhaling breath as the driver provides voice-based commands (e.g., "start the car") to the automobile. In accordance with the present invention, the system 5 can be configured to increase the volume of exhaled breath which is provided to the alcohol detection system by requiring that the driver engage in additional speaking to the system, until the system has obtained a sufficient volume of exhaled breath to ensure an accurate BRAC measurement (and hence can determine an accurate blood alcohol concentration for the driver).

By way of example but not limitation, where the alcohol detection system has not obtained a sufficient volume of exhaled breath to ensure an accurate BRAC measurement, the alcohol detection system can require additional speaking by the driver (i.e., in order to obtain additional driver exhaled breath) by presenting the driver with a series of questions which must be responded to. By way of example but not limitation, where the driver commands "start the car", the system 5 can respond with a series of questions which must be answered by the driver, e.g., "what is your name?", "what is your date of birth?", "where were you born?", etc. This series of questions and answers can be continued until the alcohol detection system has obtained a sufficient volume of exhaled breath to ensure that an accurate BRAC measurement is obtained.

It has been found that certain words cause the speaker to expel more breath, or breath in a more concentrated burst, than other words. By way of example but not limitation, words that cause the speaker to "puff" when speaking typically causes the speaker to expel more air than other words. Words that begin with consonants also tend to cause the speaker to expel more air than other words. Thus, in one form of the invention, system 5 may induce the driver to speak certain words which are known to cause more air to be expelled. By way of example but not limitation, system 5 may be configured to instruct the driver to repeat certain words (e.g., "put", "where", "task", etc.) so that the system can capture more breath from the driver, and hence obtain a more accurate BRAC measurement.

Thus, the system 5 can be configured to increase the volume of exhaled breath which is provided to the alcohol detection system, until the system has obtained sufficient volume of exhaled breath to ensure an accurate BRAC measurement, by requiring that the driver engage in additional speaking to the system.

Figure 3:
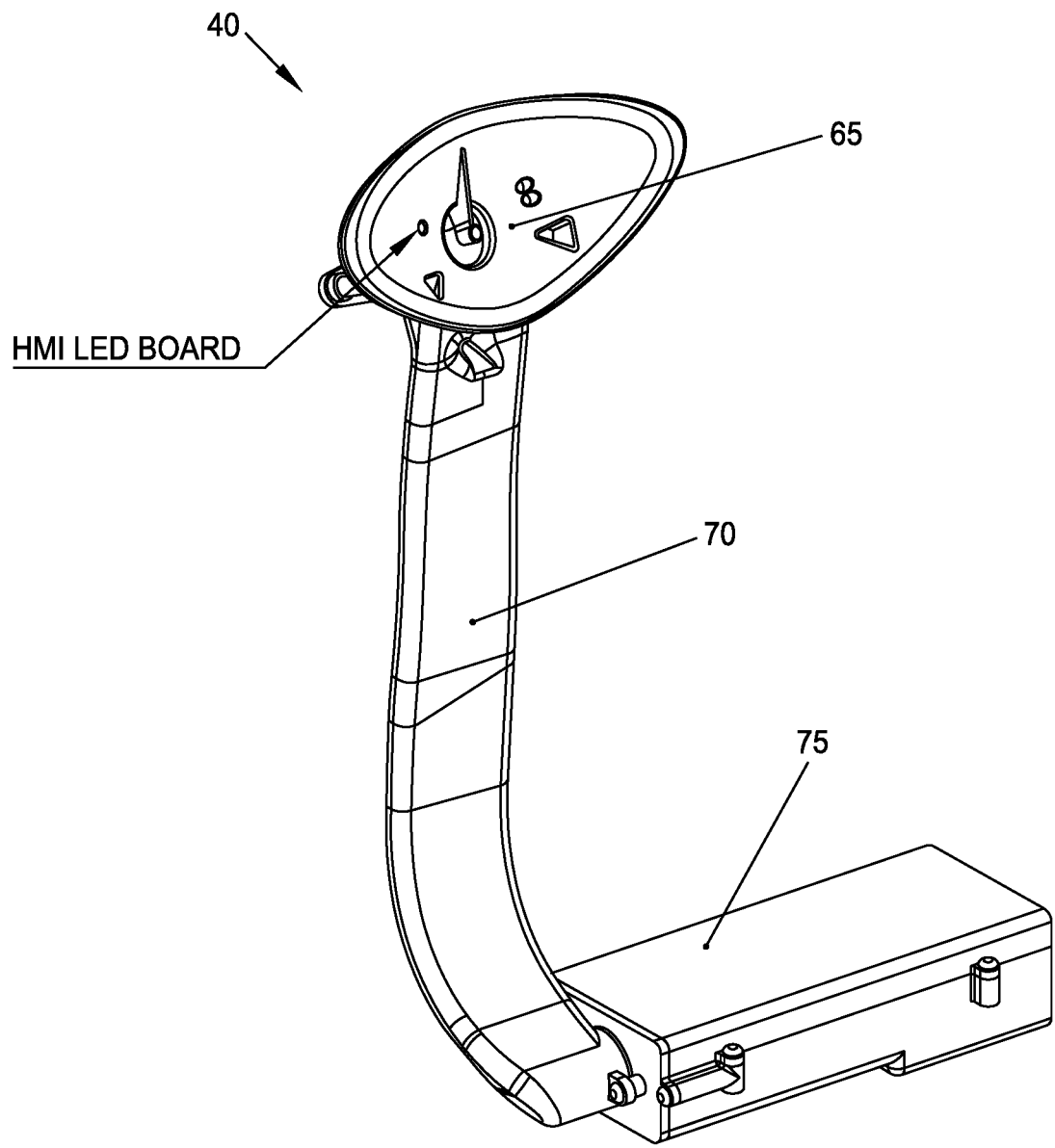
FIG. 3 is an exemplary pictorial of the breath alcohol sensor unit.

FIG. 3 shows an exemplary pictorial of a breath alcohol sensor unit 40. In one form of the invention, the breath alcohol sensor unit 40 is integrated into to the driver's door. The breath alcohol sensor unit 40 contains a fan 60 (not shown in FIG. 3 but shown in FIG. 6) that draws air into the sensor inlet 65 (FIG. 3) and down through the snorkel 70 into the breath analyzer 75. Prior art systems require the operator to blow into the breath alcohol sensor unit 40 to start the car. Prior art systems also use a disposable plastic tube or straw for the operator to blow into, which must be disposed of after each use. It can be appreciated by those skilled in the art that the apparatus in the current invention requires no straw and has no wasteful disposable parts, thereby making it environmentally friendly. It can also be appreciated that the breath alcohol sensor unit 40 does not require the operator to blow or give a directed breath into the breath alcohol sensor unit 40, it simply draws the operator's breath into the breath alcohol sensor unit utilizing the fan 60, allowing the breath alcohol sensor unit 40 to work in a "sniffer mode". However, the breath alcohol sensor unit 40 will work in the event the operator gives a directed breath sample and in some specific cases the system 5 may prompt the operator to do so. The breath analyzer 75 runs an algorithm that looks for a predetermined amount of carbon dioxide ($CO_2$) in combination with an ethanol measurement (BRAC). If the breath analyzer 75 does not measure $CO_2$ at or above the predetermined threshold, it deems the measurement invalid and prompts the operator to provide a breath sample in order to start the vehicle. This prevents the operator from providing an invalid sample, for example, by rolling down and breathing out the window while giving the "start car" command. In one form of the invention, the breath alcohol sensor unit 40 of FIG. 3 is mounted in other areas of the vehicle's cabin. In one form of the invention, there may be more than one breath alcohol sensor unit 40 integrated into the vehicle (see FIG. 6).

Note that breath alcohol sensor unit 40 is configured so that it can work in "sniffer mode", drawing the driver's breath into the breath analyzer 75. To this end, breath alcohol sensor unit 40 comprises the fan 60 which is provided to draw the driver's breath into the breath alcohol sensor unit. Note that fan 60 is preferably turned on before or when the driver starts speaking so that breath alcohol sensor unit 40 is able to capture as much breath as possible, whereby to provide a more accurate BRAC measurement (and hence provide a more accurate blood alcohol concentration reading). To this end, system 5 can be configured to turn on fan 60 when the driver's door is opened, or when the driver sits in the driver's seat, or when the driver begins to speak, etc.

Figure 4:
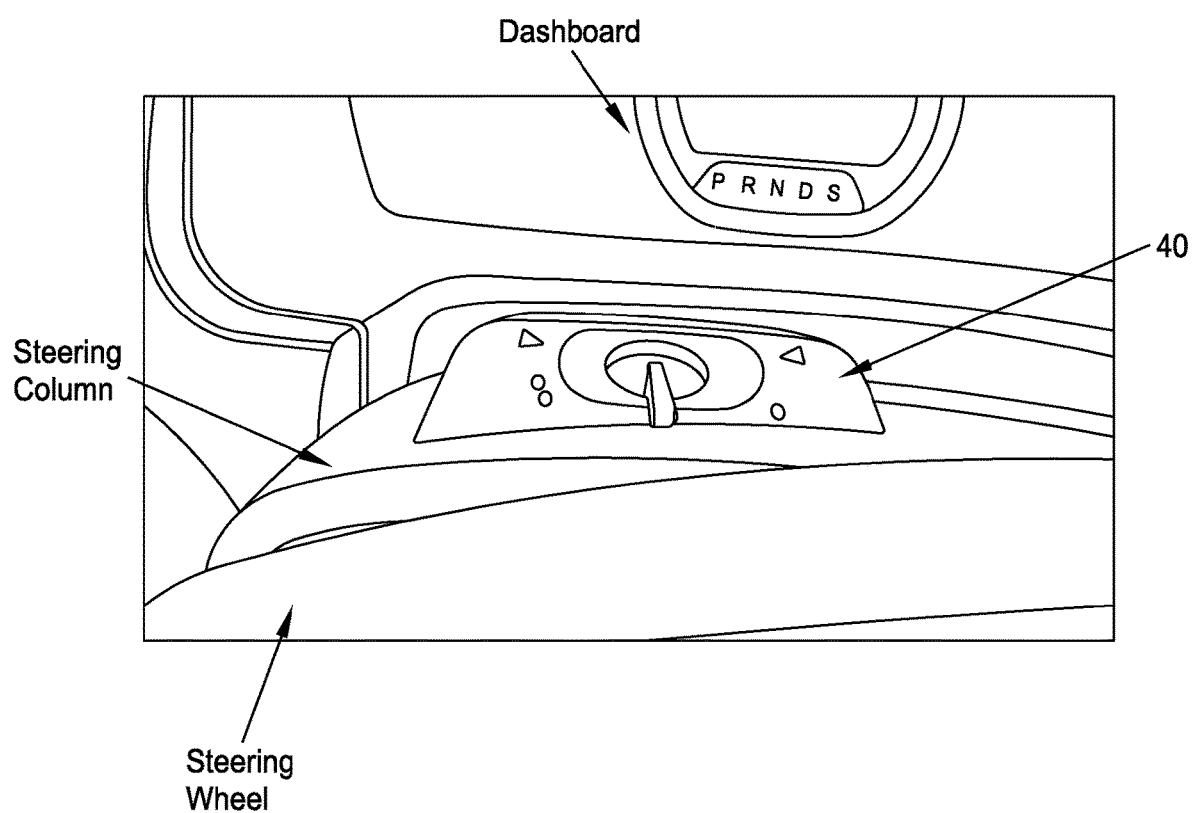
FIG. 4 is another exemplary pictorial of the breath alcohol sensor unit integrated into the vehicle steering column.

FIG. 4 is an exemplary pictorial of the breath alcohol sensor unit 40 integrated into the vehicle. More particularly, in one form of the invention, the breath alcohol sensor unit 40 in FIG. 3 is integrated into the vehicle's steering column as shown in FIG. 4. Prior art systems use a hand-held device that traditionally uses a tethered cord, so that the operator can blow into the device. However, the drawback of this prior art approach is that there is no mechanism to keep someone else from blowing into the alcohol detection system, such as the passenger or someone else sitting in the car. This allows the safe starting interlock to be bypassed and would allow the operator to drive the car regardless of breath alcohol content. The present invention has the breath alcohol sensor unit 40 mounted on the driver door and/or on the steering column, which makes it difficult for someone sitting in the passenger seat or in another location in the vehicle to interfere with the safe start mechanism.

Figure 6:
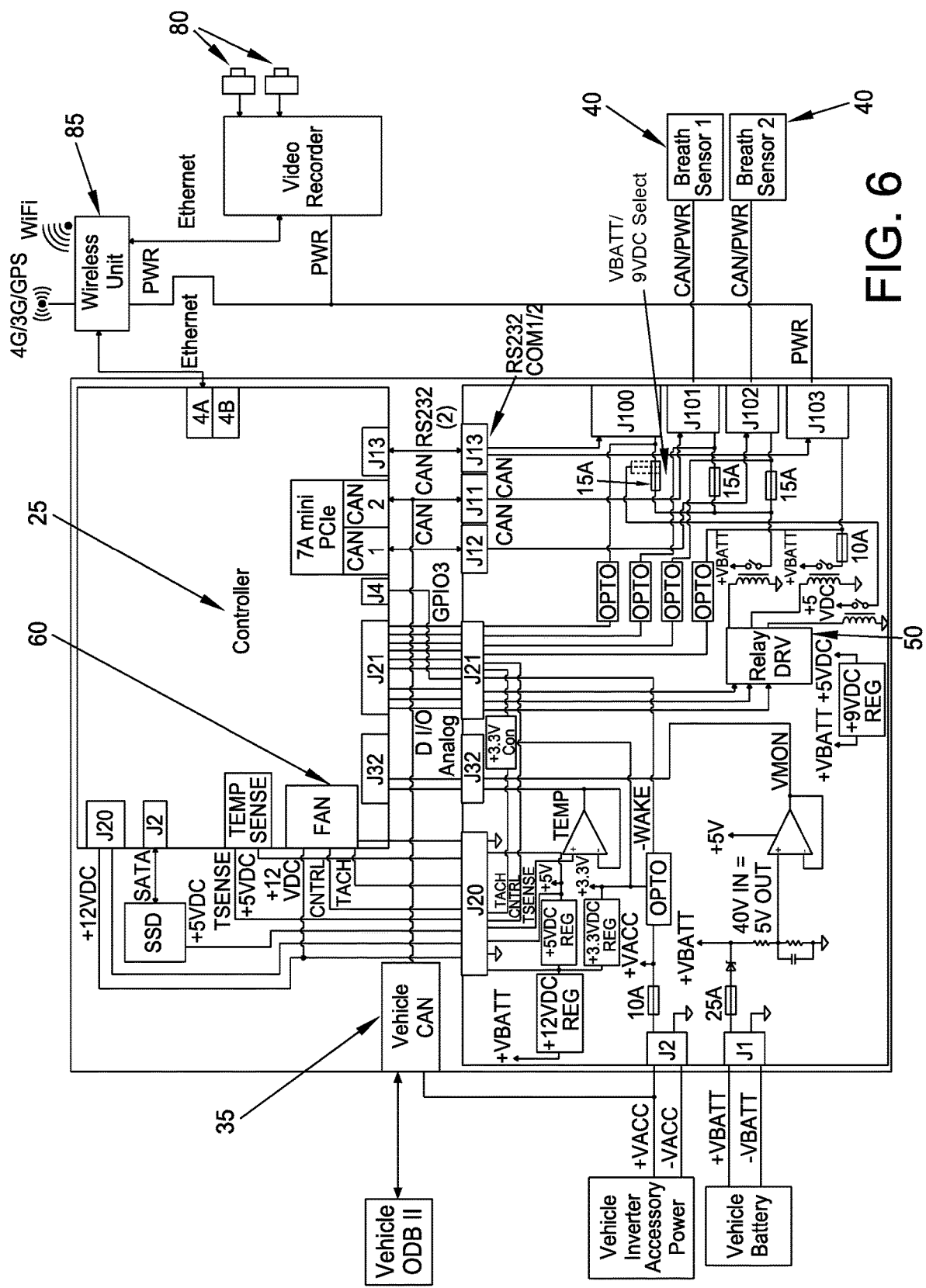
FIG. 6 is a detailed block diagram of the voice-activated vehicle start system of the present invention.

FIG. 6 is a detailed block diagram of the voice-activated vehicle start system 5. As shown in the diagram, the system 5 contains one or more cameras 80 to record activity while the operator is attempting to start the car and thereafter. It can be appreciated by those skilled in the art that the controller 25 can run a facial recognition algorithm to determine if the person giving the voice command to start the car is sitting in the driver's seat and is the operator of the vehicle. Thus, the system 5 is able to determine if someone other than the driver is attempting to give the voice command and the breath sample. If the system 5 determines that someone other than the person sitting in the driver's seat is attempting to start the car, the prompt "vehicle disabled" is given. The system 5 may also prompt for the operator to provide a directed breath sample. Also shown is FIG. 6 is the CAN interface 35 from the system 5 to the vehicle's CAN data. As those skilled in the art can appreciate, the vehicle data can be used to determine information about the driver and/or the passengers. For example, information about whether the passenger's airbag is active or not can be used to determine if a passenger is present. Also, status information about the seats, doors, windows, seatbelts, air conditioning, sunroof, etc. can be used to determine if the breath sample obtained while the operator is giving the "start car" command is valid. In one form of the invention, the controller 25 may communicate over CAN 35 with the vehicle's various automotive controllers to take actions such as turning off the car's air conditioner or disabling window roll-down during the vehicle starting process. If it is determined that the operator is not sitting in the driver's seat or gets out of the seat, the vehicle start process is aborted and in some cases, if the car is started, the ignition may be turned off.

Returning to FIG. 6, the voice-activated vehicle start system 5 also contains a wireless unit 85. The wireless unit 85 contains a cellular sub-unit that is cable of sending data and alerts over 3G or 4G LTE. If the implementation of the system 5 is in a school bus, and if the blood alcohol concentration threshold in FIG. 2 is reached, an alert may be sent out to the school bus management company, the school or the authorities (see FIG. 7). If the blood alcohol concentration threshold in FIG. 2 is the legal limit, an alert may be sent to the local police department. As can be appreciated by those skilled in the art, the alert may be accompanied by data, such as the operator's BRAC and/or blood alcohol concentration. If desired, the cellular sub-unit of wireless unit 85 may contain 5G or other state-of-the-art cellular radios. The cellular sub-unit of wireless unit 85 may also contain GPS, GNSS and/or GLONASS for vehicle location tracking and routing. In one form of the invention, the wireless unit 85 contains a wireless network modem so that the vehicle's data, BRAC measurements over time, blood alcohol concentration over time, vehicle tracking, vehicle data, video, etc. may be uploaded to network storage (e.g., "the cloud"). For example, when the vehicle is parked and able to see a network access point, such as a WiFi access point, the stored information may be uploaded to the cloud for later analysis. For example, a computer program for viewing the data may be used. The computer program may contain a graphical user interface to display the routes the vehicle has taken, real-time reports of the driver's, blood alcohol concentration, vehicle data, events and system diagnostics.

Figure 5:
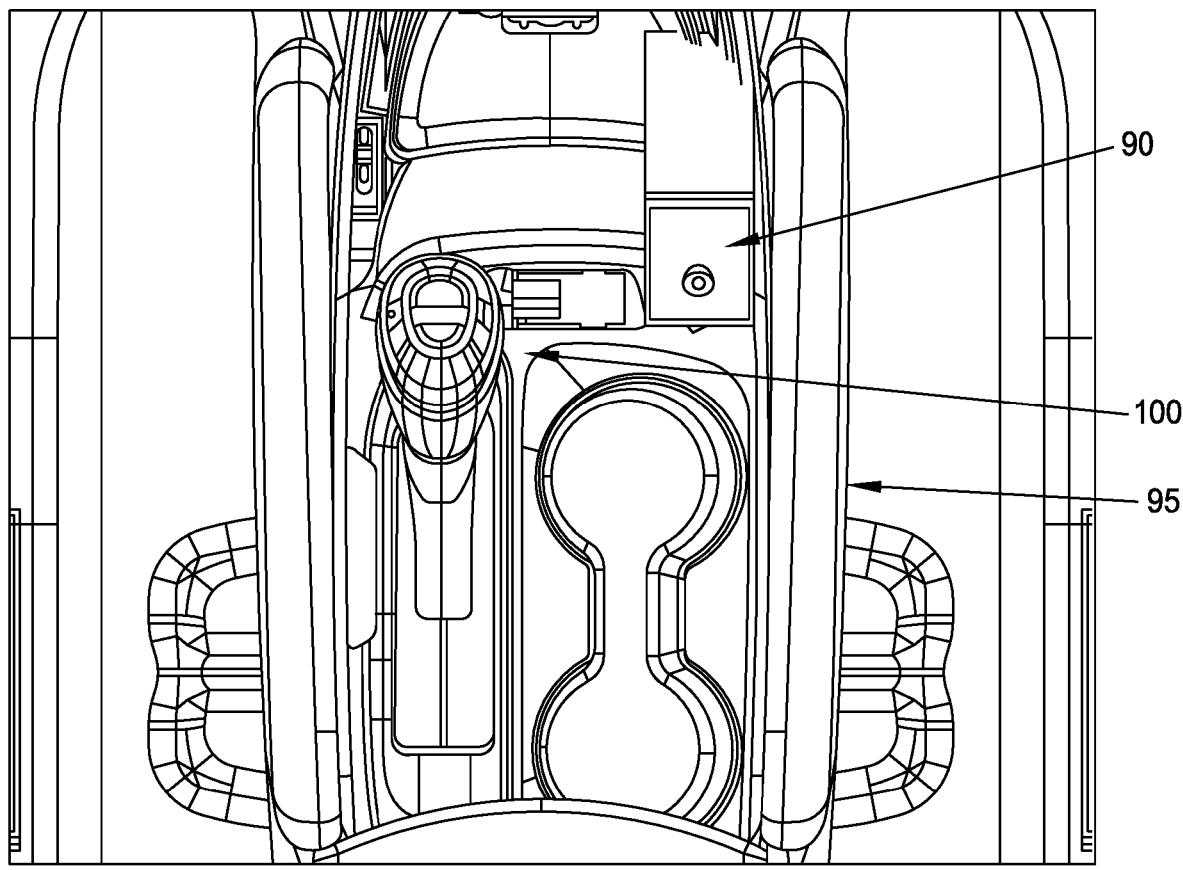
FIG. 5 is an exemplary pictorial of the touch alcohol sensor unit integrated into the vehicle center console.

FIG. 5 is an exemplary pictorial of a touch alcohol sensor unit 90 as seen from above the vehicle's center console 95 looking down. In one form of the invention, the system 5 utilizes the touch alcohol sensor unit 90 in addition to the one or more breath alcohol sensor unit 40. This can be helpful where breath alcohol sensor unit 40 yields inconclusive results, or where it is desired to confirm the results of breath alcohol sensor unit 40. The touch alcohol sensor unit 90 uses one or more lasers that are able to penetrate the skin of the operator's finger. The touch alcohol sensor unit 90 detects the returning light and able to sense the blood alcohol content using an infrared or near-infrared light. However, other spectroscopy methods using different regions of the electromagnetic spectrum could be used as well. In this exemplary pictorial, touch alcohol sensor unit 90 is integrated into the vehicle's center console 95. In one form of the invention, the driver enters the car, gives the voice command to "start car", the breath alcohol sensor unit 40 analyzes the breath of the driver to determine the blood alcohol concentration of the driver and, if the results of the breath alcohol sensor unit 40 are inconclusive, or if it is desired to confirm the results of breath alcohol sensor unit 40, the controller 25 instructs the driver to press the touch alcohol sensor unit 90, which then measures the blood alcohol concentration in the driver's blood. Depending on the results of the breath alcohol sensor unit 40 and touch alcohol sensor unit 90, controller 25 enables or disables the vehicle as appropriate. In another form of the invention, system 5 requires the use of both breath alcohol sensor unit 40 and touch alcohol sensor unit 90 in order to enable the vehicle. In this form of the invention, breath alcohol sensor unit 40 operates in "sniffer mode" to sense the blood alcohol content of the driver using the breath of the driver, and the driver is also required engage their finger with touch alcohol sensor unit 90. System 5 then enables the vehicle if the results of the breath alcohol sensor unit 40 and touch alcohol sensor unit 90 show a blood alcohol content that is below a predetermined threshold. The system 5 may also require the operator to press the brake first and then the touch alcohol sensor unit 90. It can be appreciated by those skilled in the art that the brake and touch alcohol sensor unit 90 may be electrically coupled to complete a circuit when the operator's foot touches the brake and the operator's finger presses the touch alcohol sensor unit 90. Many methods could be used to complete the circuit such as DC, AC, RF or any other type of signal using point-to-point, electrode-to-electrode, capacitively-coupled, transmitter-receiver or any other topology. This method excludes the possibility of someone else other than the driver attempting to start the car. In one form of the invention, when the voice activated vehicle start system 5 receives the "start car" command and the alcohol detection system detects a blood alcohol concentration above a predetermined threshold, it allows the car to start. However, the system 5 prevents the operator from putting the shifter 100 in gear.

Touch alcohol sensor unit 90 may comprise any touch alcohol sensor unit capable of determining the blood alcohol content of the driver through touch contact by the finger of a driver. By way of example but not limitation, touch alcohol sensor unit 90 may comprise the touch alcohol sensor unit disclosed in (i) U.S. Patent Publication No. 2017/0050518, published Feb. 23, 2017, by Automotive Coalition for Traffic Safety, Inc. and Benjamin Ver Steeg et al. for SYSTEM FOR NON-INVASIVE MEASUREMENT OF AN ANALYTE IN A VEHICLE DRIVER, and (ii) U.S. Patent Publication No. 2015/0066238, published Mar. 5, 2015, by Automotive Coalition for Traffic Safety, Inc. and Gilbert A. Todd et al. for SYSTEMS AND METHODS FOR CONTROLLING VEHICLE IGNITION USING BIOMETRIC DATA, which patent publications are hereby incorporated herein by reference.

Figure 7:
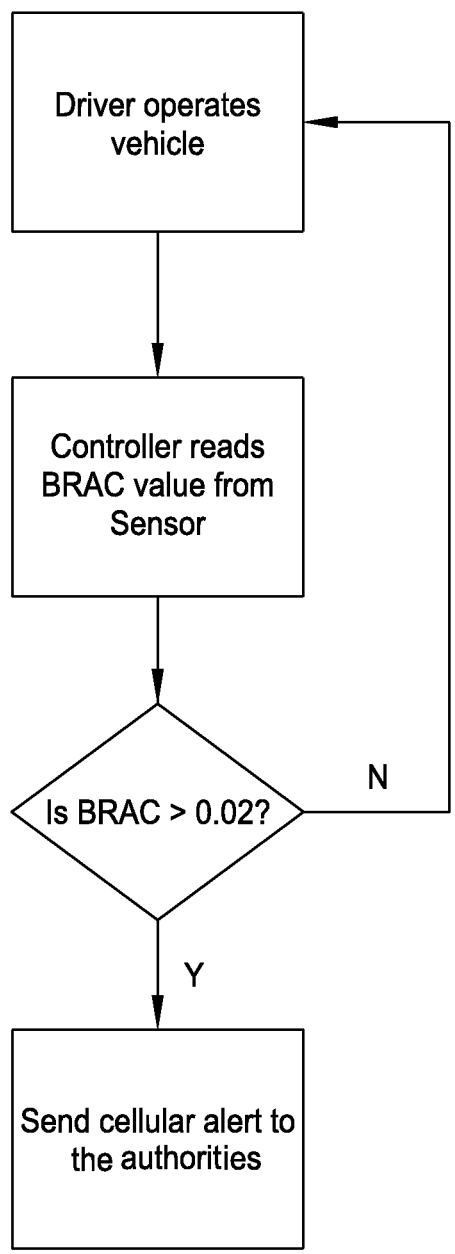
FIG. 7 is a flow diagram showing an exemplary method of an alcohol detection alert.

FIG. 7 shows an exemplary method of sending an alert when alcohol is detected by the system 5. In one form of the invention, the system 5 continues to monitor the breath alcohol sensor unit 40 after the voice activation system starts the car. This approach could be used to detect if the operator begins to drink after the car is started. In FIG. 7 a 0.02 BRAC threshold is used, however other values could be used as well. This method could be used for either the breath alcohol sensor unit 40 or the touch alcohol sensor unit 90. In one form of the invention, the touch alcohol sensor unit 90 shown in FIG. 5 is integrated into the vehicle steering wheel or throttle. This would allow the system 5 to continuously monitor the driver's hand for alcohol in FIG. 7.

Figure 8:
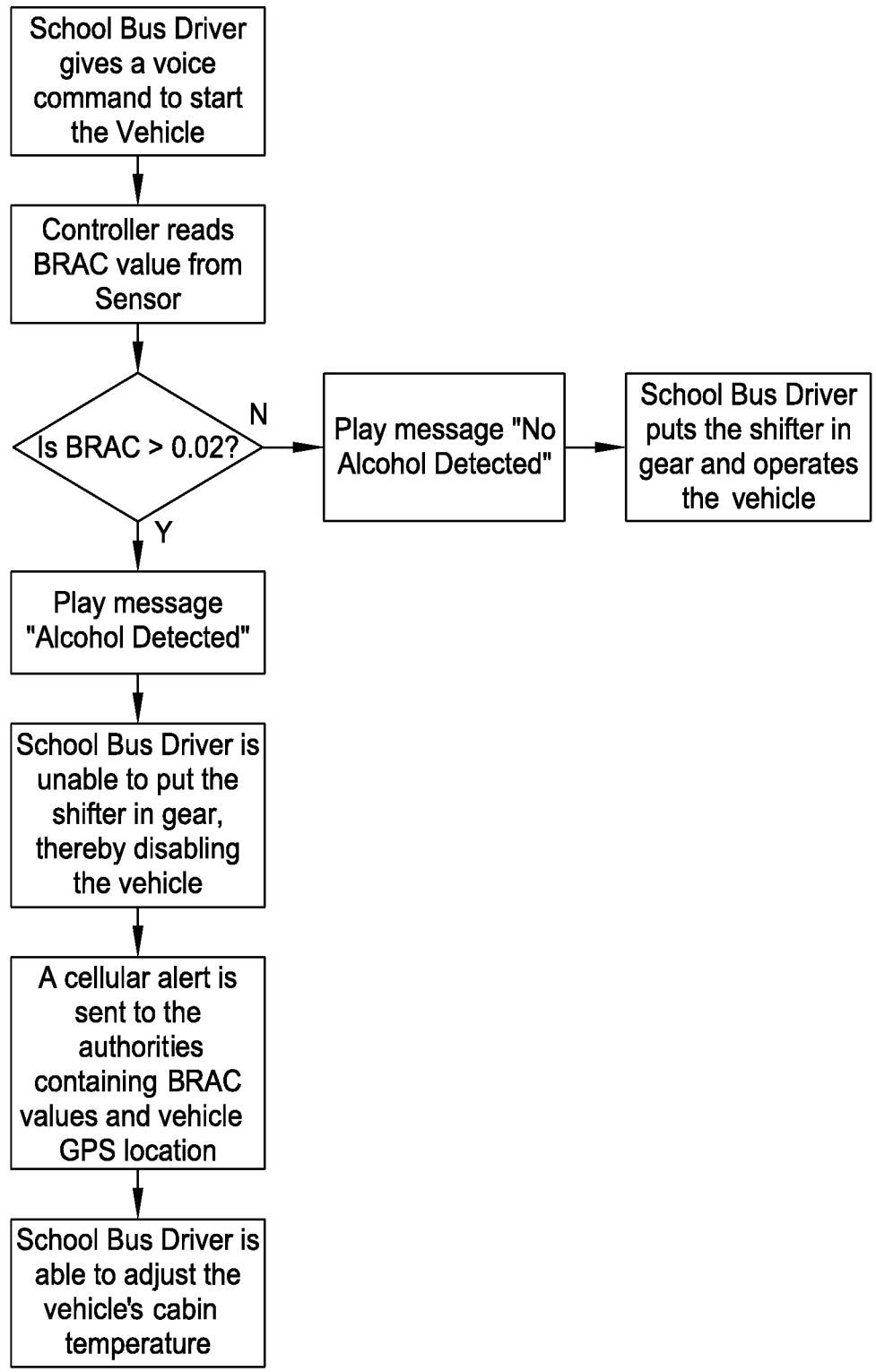
FIG. 8 is a flow diagram showing an exemplary method for controlling the operation of a vehicle using the alcohol detection apparatus.

FIG. 8 is a flow diagram showing an exemplary scenario for controlling the operation of a vehicle using the system 5. FIG. 8 connects the teaching in this specification to a real-life scenario of a school bus driver operating under a zero-alcohol tolerance law. In this example, if no alcohol is detected, the driver is able to put the bus in gear and operate the vehicle normally. However, if alcohol is detected, the driver is unable to put the bus in gear, thus disabling operation of the bus. Authorities are notified with an alert containing information about the driver's blood alcohol concentration and the location of the bus. If children are present on the bus, the driver is able to adjust the cabin temperature to a safe and comfortable setting.

It can be appreciated by those skilled in the art that the method and apparatus described herein could be applied using other types of non-invasive sensors. The teaching by the inventors does not limit the technology to alcohol. Systems for preventing other types of impaired driving could be implemented as well, including but not limited to narcotics, prescription and non-prescription medications, opioids, amphetamines, hallucinogens, synthetic drugs, carbon dioxide, carbon monoxide, etc.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A system for controlling operation of a vehicle, the system comprising:
   a voice synthesizer unit for providing voice communication to a driver;
   a speech recognition unit for receiving speech from a driver;
   a breath alcohol sensor unit for determining the concentration of alcohol in the breath of a driver and providing a signal representative of the same, wherein the signal is configured to indicate one of the following conditions:
      a below threshold condition, wherein the signal indicates that the concentration of alcohol in the breath of the driver is below a pre-determined threshold;
      an above threshold condition, wherein the signal indicates that the concentration of alcohol in the breath of the driver is above a pre-determined threshold; and
      an indeterminate condition, wherein the signal indicates that insufficient breath has been received by the breath alcohol sensor unit to determine the concentration of alcohol in the breath of the driver;
   a vehicle operation interface for controlling operation of the vehicle; and
   a controller for:
      (i) selectively causing the voice synthesizer unit to speak to the driver;
      (ii) operating the speech recognition unit to detect speech by the driver;
      (iii) receiving the signal from the breath alcohol sensor unit; and
      (iv) depending on the signal received from the breath alcohol sensor unit, providing a command to the vehicle operation interface to control operation of the vehicle;
   wherein, when the signal received by the controller from the breath alcohol sensor unit indicates the below threshold condition, the controller provides the command to the vehicle operation interface enabling operation of the vehicle;
   wherein, when the signal received by the controller from the breath alcohol sensor unit indicates the above threshold condition, the controller provides the command to the vehicle operation interface disabling operation of the vehicle; and
   wherein, when the signal received by the controller from the breath alcohol sensor unit indicates the indeterminate condition, the controller causes the voice synthesizer unit to speak to the driver in order to cause the driver to provide a spoken response, whereby to provide additional breath from the driver in order to permit the breath alcohol sensor unit to detect the concentration of alcohol in the additional breath of the driver and provide a signal representative of the same.

2. A system according to claim 1 wherein the breath alcohol sensor unit passively detects the concentration of alcohol in the breath of the driver when the driver speaks.

3. A system according to claim 2 wherein the breath alcohol sensor unit detects the concentration of alcohol in the breath of the driver when the driver gives a voice command to the vehicle.

4. A system according to claim 1 wherein the controller uses the voice synthesizer unit to prompt the driver to speak words.

5. A system according to claim 4 wherein the words are answers to questions prompted by the voice synthesizer unit.

6. A system according to claim 4 wherein the words are specific words to be repeated by the driver.

7. A system according to claim 1 wherein the signal from the breath alcohol sensor unit is further configured to indicate the following additional condition:
a below threshold but above a second pre-determined threshold condition, wherein the signal indicates that the concentration of alcohol in the breath of the driver is below the pre-determined threshold but above the second pre-determined threshold;
and further wherein, when the signal received by the controller from the breath alcohol sensor unit indicates the below threshold but above a second pre-determined threshold condition, the controller causes the voice synthesizer unit to provide a notification to the driver.

8. A system according to claim 1 wherein the controller is configured to obtain data about the driver and/or passengers before and/or during the time when the alcohol measurement is taken by the breath alcohol sensor unit.

9. A system according to claim 1 wherein the controller commands the vehicle operation interface to disable specific functions before and/or during the time when the breath alcohol sensor unit determines the concentration of alcohol in the breath of the driver.

10. A system according to claim 1 wherein the system further comprises a touch alcohol sensor unit for performing a second alcohol measurement, wherein the second alcohol measurement is performed using a touch sensor.

11. A system according to claim 1 wherein the controller commands the vehicle operation interface to disable operation of the vehicle if the driver leaves the driver's seat.

12. A system according to claim 1 wherein the pre-determined threshold is the legal alcohol limit in a given governance.

13. A system according to claim 1 wherein an alert is sent over a wireless network when the signal received by the controller from the breath alcohol sensor unit indicates the above threshold condition.

14. A system according to claim 13 wherein the alert contains at least one of (i) data indicating the concentration of alcohol in the breath of the driver, and (ii) vehicle location data.

15. A system according to claim 1 wherein the controller is further configured to determine if someone other than the driver of the vehicle is attempting to give a voice command and, if the controller determines that someone other than the driver is attempting to give a voice command, the controller commands the vehicle operation interface to disable operation of the vehicle.

16. A system according to claim 1 wherein the system further comprises at least one from the group consisting of a wireless network unit for transmitting data over a wireless network and a video recorder system for recording video.

17. A method for controlling operation of a vehicle occupied by a driver, the method comprising:
identifying speech by the driver;
determining the concentration of alcohol in the breath of the driver and providing a signal representative of the same, wherein the signal is configured to indicate one of the following conditions:
a below threshold condition, wherein the signal indicates that the concentration of alcohol in the breath of the driver is below a pre-determined threshold;
an above threshold condition, wherein the signal indicates that the concentration of alcohol in the breath of the driver is above a pre-determined threshold; and
an indeterminate condition, wherein the signal indicates that insufficient breath has been received by the breath alcohol sensor unit to determine the concentration of alcohol in the breath of the driver;
when the signal indicates the below threshold condition, enabling operation of the vehicle;
when the signal indicates the above threshold condition, disabling operation of the vehicle; and
when the signal indicates the indeterminate condition, causing the driver to speak, whereby to provide additional breath from the driver to detect the concentration of alcohol in the additional breath of the driver and provide a signal representative of the same.

18. A method according to claim 17 wherein the signal is further configured to indicate the following additional condition:
a below threshold but above a second pre-determined threshold condition, wherein the signal indicates that the concentration of alcohol in the breath of the driver is below the pre-determined threshold but above the second pre-determined threshold;
and further wherein, when the signal indicates the below threshold but above a second pre-determined threshold condition, a notification is provided to the driver.

19. A method according to claim 17 wherein the pre-determined threshold is the legal limit in a given governance.

20. A method according to claim 17 wherein specific functions of the vehicle are disabled before and/or during the time when the concentration of alcohol in the breath of the driver is being determined.

21. A method according to claim 17 wherein operation of the vehicle is disabled if the driver leaves the driver's seat.

22. A method according to claim 17 wherein information is obtained about the driver and/or passengers before and/or during the time when the concentration of alcohol in the breath of the driver is being determined.

23. A method according to claim 17 wherein an alert is sent over a wireless network when the signal indicates the above threshold condition.

24. A method according to claim 23 wherein the alert contains at least one of (i) data indicating the concentration of alcohol in the breath of the driver, and (ii) vehicle location data.

25. A method according to claim 17 wherein operation of the vehicle is disabled if it is determined that someone other than the driver is attempting to give the voice command.

26. A system according to claim 6 wherein the specific words are selected so as to increase the volume of air expelled by the spoken response.

* * * * *